(12) United States Patent
McKee et al.

(10) Patent No.: US 6,844,943 B2
(45) Date of Patent: Jan. 18, 2005

(54) METHOD AND APPARATUS FOR VIDEO RECORDING FROM PREVIOUS RECORDED VIDEO

(75) Inventors: Harold Rhea McKee, Franklin, IN (US); Karl Francis Horlander, Indianapolis, IN (US); John Homer Furrey, Indianapolis, IN (US); Joseph Craig Engle, Carmel, IN (US)

(73) Assignee: Thomson Licensing SA, Boulogne Cedex (FR)

( * ) Notice: Subject to any disclaimer, the term of this patent is extended or adjusted under 35 U.S.C. 154(b) by 273 days.

(21) Appl. No.: 09/725,439

(22) Filed: Nov. 29, 2000

(65) Prior Publication Data

US 2002/0064369 A1 May 30, 2002

(51) Int. Cl.$^7$ ............................................... H04N 1/41
(52) U.S. Cl. .................. 358/471; 358/426.03; 358/465; 382/252
(58) Field of Search .......................... 358/471, 406, 358/409, 426.03, 426.09, 463, 465, 908, 527, 476, 479; 382/252; 345/616; 348/466, 478, 479, 512, 510, 544, 545, 463

(56) References Cited

U.S. PATENT DOCUMENTS

| | | | | |
|---|---|---|---|---|
| 3,594,498 A | * | 7/1971 | Smith | 178/6.6 |
| 3,749,826 A | * | 7/1973 | Arimura | 178/5.4 |
| 4,163,253 A | * | 7/1979 | Morio | 358/120 |
| 4,283,735 A | | 8/1981 | Jagger | 355/4 |
| 4,319,286 A | | 3/1982 | Hanpachern | 360/33 |
| 4,390,904 A | | 6/1983 | Johnston et al. | 355/335 |
| 4,873,582 A | * | 10/1989 | Furuhata | 358/310 |
| 4,979,047 A | | 12/1990 | Wine | 358/335 |
| 5,347,365 A | * | 9/1994 | Harigai | 348/525 |
| 5,475,440 A | * | 12/1995 | Kobayashi | 348/498 |
| 5,485,219 A | * | 1/1996 | Woo | 348/460 |
| 5,610,667 A | * | 3/1997 | Hush | 348/796 |
| 6,037,994 A | * | 3/2000 | Bae | 348/510 |
| 6,483,987 B1 | * | 11/2002 | Goldschmidt | 386/83 |

FOREIGN PATENT DOCUMENTS

| | | | |
|---|---|---|---|
| EP | 0158293 | 10/1985 | G11B/15/02 |
| EP | 0384388 | 8/1990 | H04N/5/50 |
| JP | 61007783 | * 1/1986 | H04N/5/93 |
| JP | 405282736 | * 10/1993 | H04N/5/782 |
| JP | 363203074 | * 8/1998 | H04N/7/00 |
| NL | 3533700 | * 3/1987 | H04N/5/95 |

OTHER PUBLICATIONS

Patent Abstracts of Japan, Publn. No. 03187045, Aug. 15, 1991.
Radio–Electronics, "Build this Automatic Commercial Editor for your VCR", G. McClellan, Dec. 1982, pp. 41–46.
Radio–Electronics, "Build this Automatic Commercial Editor for your VCR, Part 2", G. McClellan, Feb. 1983. pp. 57–59 and p. 104.
Television, "The Sony Betamax VCR System", D. Matthewson, Feb. 1979, pp. 206–207.

* cited by examiner

Primary Examiner—Jerome Grant, II
(74) Attorney, Agent, or Firm—Joseph S. Tripoli; Harvey D Fried; Joseph J. Kolodka

(57) ABSTRACT

A system and method for eliminating absent or poor quality video sections from a video recording, such as a second generation of video recording. Synchronizing pulses associated with a video signal to be recorded are analyzed to determine whether a video signal is present and, further, to determine whether the video signal is not distorted (i.e., non-trick play mode). A recording device is selectively paused in response to the absence of a valid video signal or the presence of a video signal that is distorted, of poor quality or otherwise not worth recording.

19 Claims, 3 Drawing Sheets

METHOD AND APPARATUS FOR VIDEO RECORDING FROM PREVIOUS RECORDED VIDEO

CROSS-REFERENCE TO RELATED APPLICATIONS

This patent application is related to U.S. Patent Application No. 02/0118045-A1, filed Nov. 29, 2000 which is incorporated herein by reference in its entirety.

BACKGROUND OF THE INVENTION

1. Field of the Invention

The invention relates to video recording systems and, more particularly, video recording systems responsive to video source quality.

2. Description of the Prior Art

In a system for recording a received video signal, such as a video cassette recorder (VCR), a video input device within a computer system and the like, it is sometimes desirable to avoid recording at least portions of the received video signal. For example, U.S. Pat. No. 4,283,735 discloses a technique for detecting color information within a received video signal including both color and black and white imagery such that a video tape recorder may selectively record only non-color video imagery. In this manner, the video tape recorder records only a desired monochrome portion of a movie or broadcast by avoiding the recording of station breaks or commercials interspersed therein, which station breaks and commercials are typically provided in color.

Unfortunately, the above-referenced "commercial killer" technique is useful only in those situations where desirable and undesirable portions of a video program may be determined with respect to the presence or absence of color (or monochrome) imagery in a video signal.

SUMMARY OF THE INVENTION

The invention comprises a system and method for eliminating poor or non-existent video, or selected video sections, from a video recording, such as a second generation video recording. The present invention operates to determine whether synchronizing pulses, such as vertical and/or horizontal synchronizing pulses indicative of the presence of a television signal are received. Moreover, in a case of received synchronizing pulses, those pulses are evaluated to determine if synchronizing pulse distortions indicative of likely video signal distortions are present. In a case of absent synchronizing pulses or distorted synchronizing pulses, a recording device is paused, such that a recording medium does not include blank portions or poor quality portions. The absence of synchronizing pulses indicates that the recording device is not receiving a valid video signal. Distorted synchronizing pulses indicate that, for example, a received video signal comprises a trick mode (e.g., fast forward, fast play or rewind), which trick mode signal does not convey useful information and should not be recorded. Additionally, other distortions indicative of transmission problems or other video signal degradations further indicate that such video signal should not be recorded.

Apparatus according to one embodiment of the invention comprises: an input circuit for receiving a video signal indicative of playback of a first recorded medium; a detection circuit for detecting a horizontal synchronization signal component of said video signal; and a control circuit for controlling pauses in recording of video information from the video signal responsive to detecting the horizontal synchronizing signal.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The invention will be described within the context of a television receiver operating according to the National Television Standards Committee (NTSC) standards. It will be appreciated by those skilled in the art that the invention is applicable to other television standards, such as the Phase Attenuating Line (PAL) and Sequential Color With Memory (SECAM) standards. Moreover, it will be appreciated by those skilled in the art that the invention is applicable to any video signal including periodically occurring synchronizing (SYNC) components wherein perturbations in the periodicity or shape of the synchronizing components may reasonably be construed as reflecting the presence or quality of associated video signal.

Figure 1:
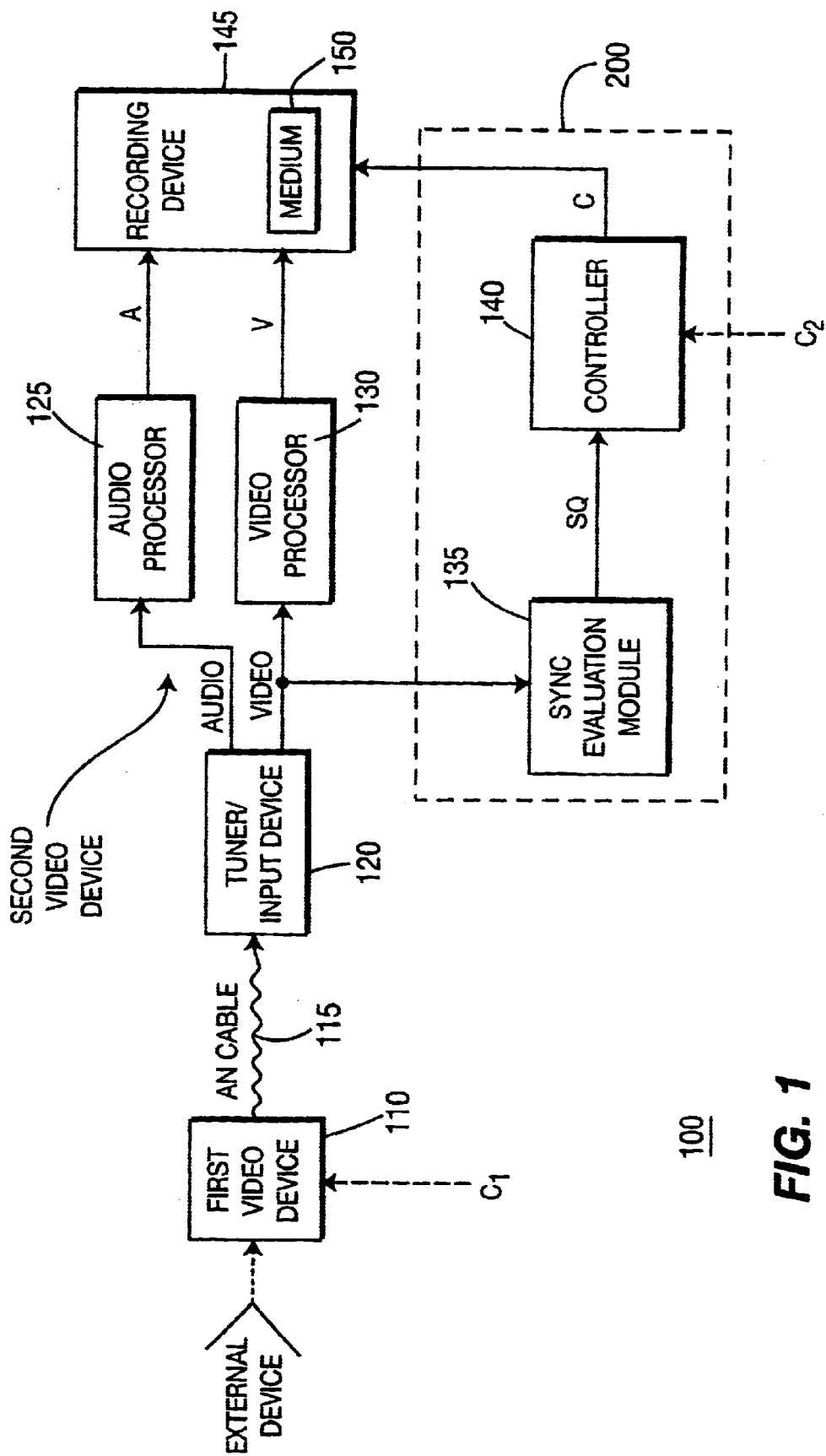
FIG. 1 depicts a block diagram of a video recording system according to an embodiment of the invention.

FIG. 1 depicts a high level block diagram of a video recording system according to an embodiment of the invention. Specifically, FIG. 1 depicts a high level block diagram of a video recording system 100 comprising a first video device 110 that sources a video signal and, optionally, audio, control and other associated signals to a second video device via an audio/video (A/V) cable 115. The second video device comprises a tuner/input device 120, an audio processor 125, a video processor 130, a synchronizing component (SYNC) detection and evaluation module 135, a controller 140 and a recording device 145.

The first video device 110 may comprise any video source, such as a video cassette recorder (VCR), camcorder, digital video disk (DVD) player, computer video output device and the like. It is assumed that the first video device 110 provides at least an output video signal including image portions and synchronizing portions, such as an analog NTSC video signal or digital video stream. The output video signal may comprise a composite video signal, a video signal including separate luminance and chrominance portions or any other video signal format. The output video signal may be of analog or digital format.

The first video device 110 optionally responds to a control signal $C_1$ received from, for example, a remote control device (not shown). Thus, the output of the first video device 110 may be caused to play, stop, pause or enter one of a number of trick play modes (e.g., fast forward, fast play, rewind and the like) in response to commands received from a remote control device.

The A/V cable 115 may comprise any wired (or wireless) medium suitable for transporting at least video signals including image and synchronization portions and, desirably, associated audio and/or control signals to the second video device. It is noted that some transport mediums are susceptible to various external stimuli (e.g., RF fields)

such that signals carried or transmitted via these transport mediums may be perturbed or degraded to the point where the information conveyed is qualitatively unacceptable.

The tuner/input device 120 tunes and/or receives the video and audio information provided to the second video device in a known manner. For example, the tuner/input device may comprise a radio frequency (RF) tuner for selecting one of a plurality of RF carrier signals, an intermediate frequency (IF) stage for down converting video and audio information from the selected carrier frequency and other known circuitry suitable for retrieving baseband audio and video signals from the A/V cable 115.

The tuner/input device 120 provides any received audio information as a first output signal audio, and any received video video information as a second output signal video. The first output signal audio is coupled to the audio processor 125, while the second output signal video is coupled to the video processor 130 and the SYNC evaluation module 135.

The audio processor 125 performs any additional processing of the audio signal audio to produce a processed audio signal (A), which is coupled to the recording device 145. The video processor 130 performs any additional processing of the video signal video to produce a processed video signal V which is coupled to the recording device 145.

The recording device 145 cooperates with a medium 150, such as a video cassette, hard disk drive, floppy disk drive, flash memory device, compact disk, video disk or any other recording medium. The recording device 145 operates to record, onto the medium 150, information representative of the processed video signal V and, if present, the processed audio signal A.

The recording device 145, in response to a control signal C produced by the controller 140, enters one of a record mode and a record-pause (or pause) mode. Thus, the controller 140 is used to selectively pause the recording device 145 such that received video V and audio A is selectively stored on the medium 150.

The SYNC evaluation module 135 and controller 140 operate to effect a synchronization component detection and evaluation function, as well as a control function.

The controller 140 may selectively cause the recording device 145 to begin recording at a given time. In this manner, portions of the audio and video information provided by the first video device 110 may be recorded onto the medium 150, while other portions are not recorded. For example, it is desirable to pause the recording process when the received video signal is distorted, when the received video signal comprises a trick play signal such as fast forward, rewind, fast play and the like, when the received video signal includes undesirable content such as commercials or station breaks, or, generally, when the received video signal is anything other than a normal (i.e., play mode) video signal.

The SYNC evaluation module 135 receives the video signal VIDEO provided by the timer/input device 120. The SYNC evaluation module 135 processes at least the synchronizing components associated with the received video signal VIDEO to evaluate the presence and/or quality of the synchronizing component. For example, in the case where the SYNC evaluation module determines that horizontal and/or vertical synchronizing information does not exist within the video signal VIDEO, then it is likely that the tuner/input device 120 is not presently receiving a valid video signal, or that a received video signal is highly distorted and, therefore, unusable.

In the case of the SYNC evaluation module 135 determining that synchronizing information does not exist or is unacceptable due to distortion or other reasons, a SYNC quality output signal SQ indicates that such condition exists. In the case where the SYNC evaluation module 135 determines that synchronizing information within the video signal is present and is of sufficient quality (e.g., within threshold limits for SYNC "stretch," SYNC pulse shape and other factors), the SYNC quality signal SQ indicates this condition.

An embodiment of the SYNC evaluation module 135 will be described below with respect to FIG. 3. Briefly, the SYNC evaluation module module 135 of FIG. 3 operates to separate horizontal and vertical synchronizing from other components within the video signal VIDEO. The known periodic nature of the horizontal and video synchronizing components are evaluated using horizontal and vertical lock detection circuits such that timing discrepancies indicative of the absence or qualitative degradation of the horizontal and vertical synchronizing components are noted and provided to respective horizontal and vertical error counters. If the amount of errors exceeds a threshold limit, then the SYNC quality output signal SQ is used to indicate such event.

The SYNCH evaluation module 135 may also be implemented according to the SYNC detector described in commonly assigned U.S. patent application Ser. No. 02/0118045-A1, filed Nov. 29, 2000, which is incorporated herein by reference in its entirety. Briefly, the disclosed detector operates to detect changes in the temporal spacing of synchronizing pulses, such as vertical and/or horizontal synchronizing pulses within a television or video signal. Such changes may comprise, for example, a gross change in the time period associated with the synchronizing signals (i.e., large changes within the time intervals separating successive synchronizing signals). Such changes may also comprise, for example, changes in the pulse width of synchronizing pulses, such as horizontal synchronizing pulses and/or vertical synchronizing pulses. For example, in the case of video tape stretch or other physical anomalies that induce timing irregularities into a video signal, the disclosed detector may be used to identify degradation synchronizing pulses indicative of corresponding degradations to the video image information.

The SYNC evaluation module 135 may implement a method comprising the steps of: associating temporal information with each of a sequence of received synchronization pulses; measuring temporal differences between successive synchronization pulses to determine respective synchronization pulse timing intervals; measuring temporal differences between successive synchronization pulse timing intervals; and providing a SYNC quality signal SQ indicative of whether differences between successive synchronization pulse timing intervals exceed a threshold level. It is noted that the threshold level may be defined in terms of time, expected intervals, percentage deviation or error with respect to expected intervals or any metric suitable for indicating that a timing anomaly has occurred.

The controller 140 of FIG. 1 is responsive to the SYNC quality signal SQ provided by the SYNC evaluation module 135. In response to a SYNC quality signal SQ indicative of valid and acceptable synchronization information within the video signal VIDEO, the controller 140 causes the recording device 145 to enter or maintain a record mode of operation. In response to a SYNC quality signal SQ indicative of absent or unacceptable synchronization information within the video signal, the controller 140 causes the recording device 145 to enter a record-pause or pause mode of operation.

Optionally, the controller 140 responds to a control signal $C_2$ from, for example, a remote control device (not shown)

such that the operation of the recording device 145 within the second video device may be remotely controlled.

It is noted that in the case of the first video device 110 and second video device being responsive to similar remote control signals (e.g., both video devices being manufactured by the same company or adhering to the same control standards), the control signals $C_1$ and $C_2$ may simultaneously cause both the first video device 110 and second video device to record. In this instance, two recordings of video information provided to the first video device via an external source are made.

In one application of the invention, where the first video device 110 comprises a camcorder including a plurality of scenes or recorded segments including "white space," or other video glitches, the second video device will operate to record only the valid video information conveyed by the first video device. That is, where the video information associated with the first video device includes invalid portions of video, the second video device will not record those invalid portions of video data. In this manner, the invention is operable to "clean up" sequences of video imagery including invalid portions.

Figure 2:
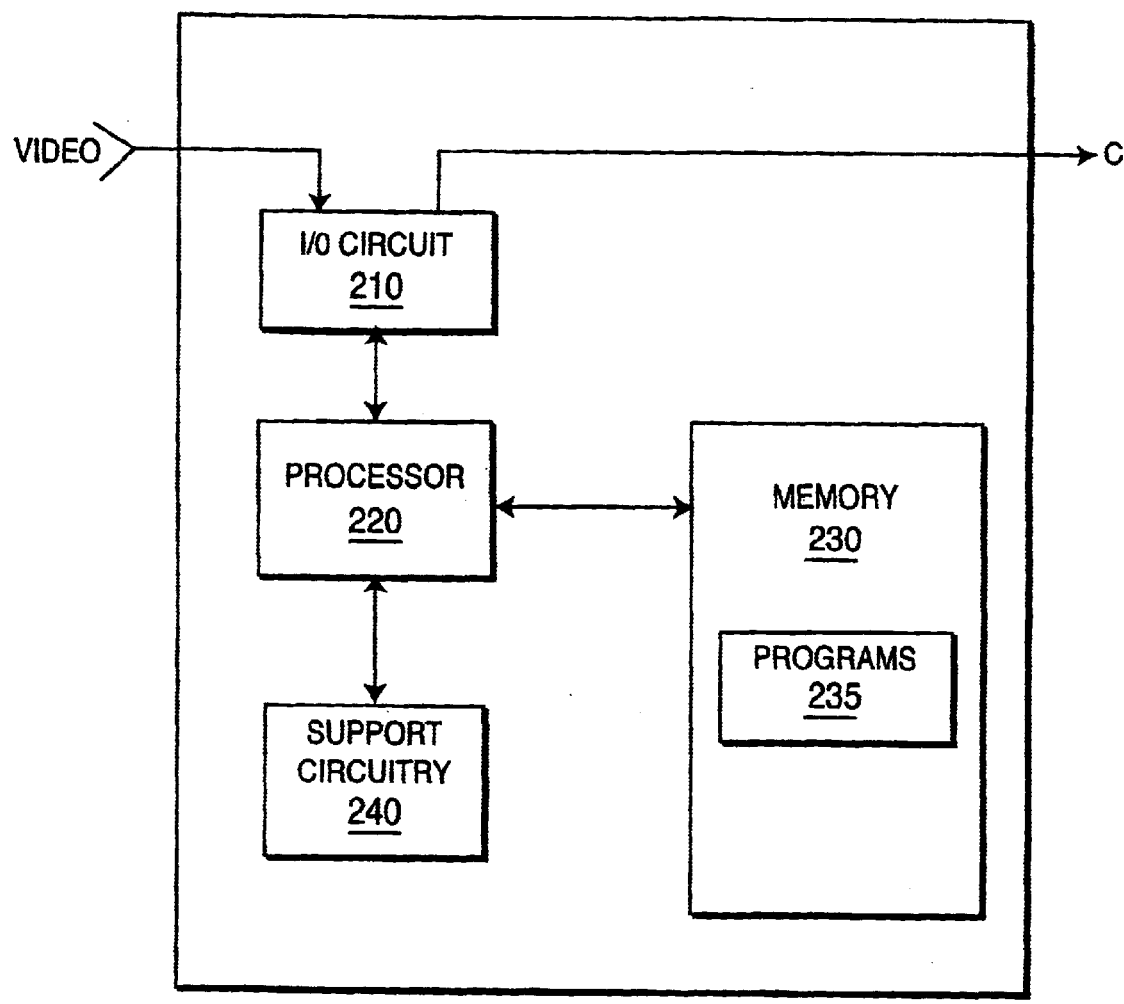
FIG. 2 depicts a high level block diagram of a controller suitable for implementing the functionality of the detector 100 of FIG. 1.

FIG. 2 depicts a high level block diagram of a controller suitable for implementing the functionality of the SYNCH evaluation module 135 and controller 140 of the system 100 of FIG. 1. The controller 200 of FIG. 2 implements the synchronization component evaluation method described below with respect to FIG. 3. Alternately, the controller 200 of FIG. 2 implements methods discussed in U.S. patent application Ser. No. 02/0118045-A1, filed Nov. 29, 2000, which is incorporated herein by reference in its entirety. The controller 200 also implements control functionality useful in adapting the operation of the recording device 145 to the presence and/or quality of an evaluated synchronizing component of a video signal, or to a control signal provided by, for example, a remote control device.

The controller 200 of FIG. 2 comprises a processor 220 as well as memory 230 for storing various detection and control programs 235. The processor 220 cooperates with conventional support circuitry 240 such as power supplies, clock circuits, cache memory and the like as well as circuits that assist in executing the software routines stored in the memory 230. As such, it is contemplated that some of the process steps discussed herein as software processes may be implemented within hardware, for example, as circuitry that cooperates with the processor 220 to perform various steps. The controller 200 also contains input/output (I/O) circuitry 210 that forms an interface between the various functional elements required to implement the detector function described above with respect to FIG. 1. For example, the controller 200 of FIG. 2 may be used to replace elements 135 and 140 of the system 100 of FIG. 1.

Thus, the controller 200 of FIG. 2 receives a video signal VIDEO having associated with it synchronizing components. The synchronizing components may comprise horizontal and vertical synchronizing. The controller 200 processes the video signal VIDEO to produce a control signal C indicative of an appropriate operating mode of the recording device 145

Although the controller 200 of FIG. 2 is depicted as a general purpose computer that is programmed to perform various detection and processing functions in accordance with the present invention, the invention can be implemented in hardware as, for example, an application specific integrated circuit (ASIC). As such, the process steps described herein are intended to be broadly interpreted as being equivalently performed by software, hardware, or a combination thereof.

Figure 3:
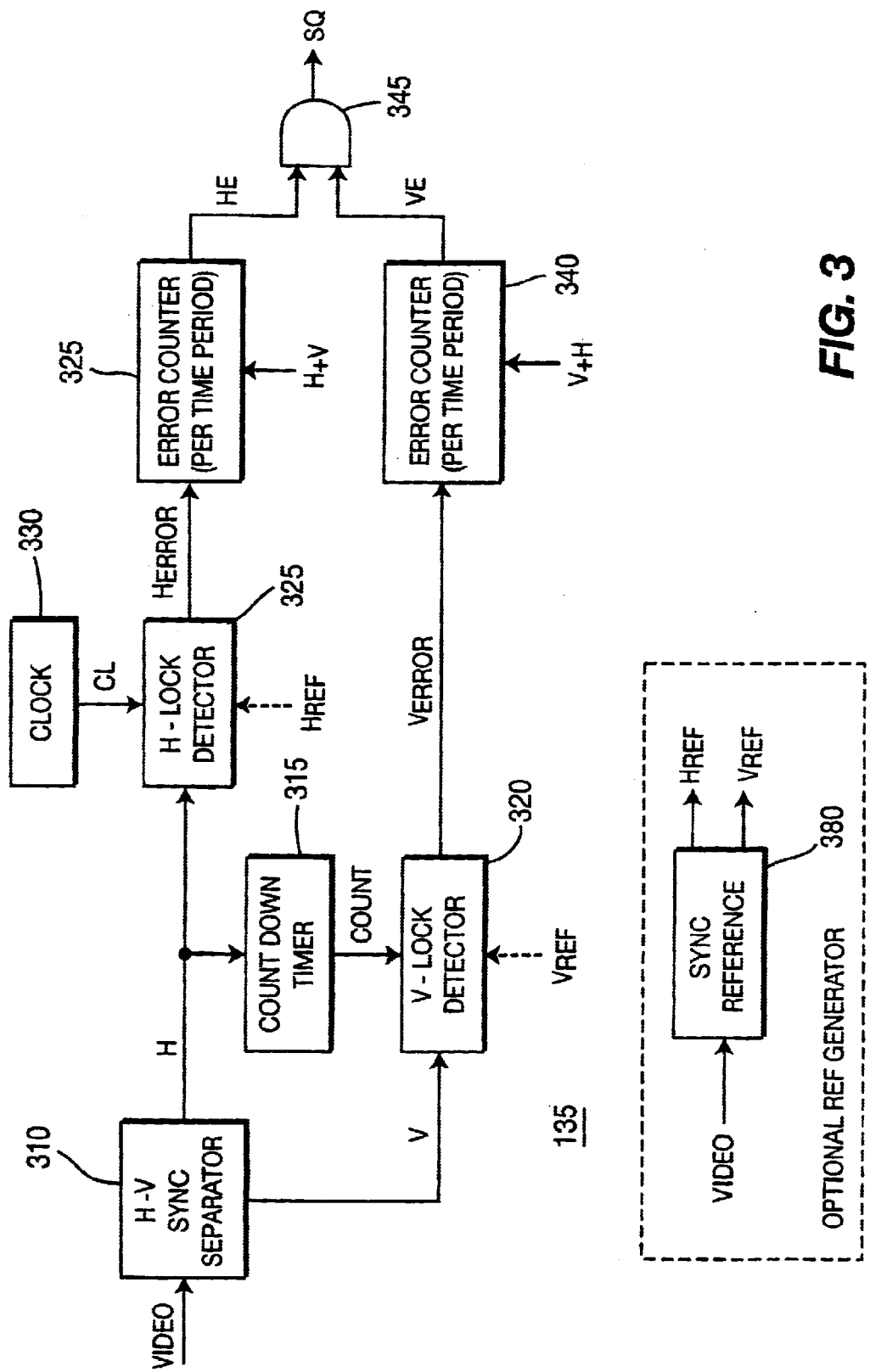
FIG. 3 depicts a high level block diagram of a SYNC evaluation module suitable for use in the system of FIG. 1.

FIG. 3 depicts a high level block diagram of a SYNC evaluation module suitable for use in the system of FIG. 1. Specifically, the SYNC evaluation module 135 of FIG. 3 receives the video signal VIDEO, evaluates the synchronization information within the video signal VIDEO, and provides an output signal SQ indicative of the quality of the evaluated synchronization information.

The SYNC evaluation module 135 of FIG. 3 comprises a horizontal-vertical (H-V) SYNC separator 310, a count down timer 315, a vertical lock detector 320, a horizontal lock detector 325, an oscillator or clock circuit 330, a horizontal error counter 335, a vertical error counter 340 and a logical AND gate 345. Optionally, the SYNC evaluation module 135 includes an optional horizontal and/or vertical reference generator 380. It will be appreciated by those skilled in the art that various common support circuitry, such as debouncing or similar circuitry is not shown for clarity.

The H-V SYNC separator 310 separates the horizontal H and vertical V synchronization pulses included within the received video signal VIDEO. A signal comprising at least the separated horizontal synchronization pulses H is coupled to the horizontal lock detector 325 and the countdown timer 315. A signal comprising at least the separated vertical synchronization pulses V is coupled to the vertical lock detector 320. The clock circuit 330 provides a clock signal to the horizontal lock detector 325.

The horizontal lock detector 325 utilizes the provided clock signal CL to determine time intervals within which a horizontal synchronizing pulse is expected to arrive. The H-lock detector 325 notes the synchronizing occurrence of a horizontal pulse via edge or level triggering circuitry (not shown). The H-lock detector 325 provides an output signal $H_{ERROR}$ indicative of whether an expected horizontal SYNC pulse H failed to arrive.

The countdown timer 315 produces an output signal COUNT each time a predetermined number of horizontal SYNC pulses H are received. For example, it is known that in the NTSC system there are 262.5 horizontal scan lines per vertical SYNC pulse. This does not include the "serration pulses" which are provided at two times the horizontal scan rate. If the serration pulses are included as pulses to be counted between vertical pulses, then there are about eight additional midway pulses per vertical scan to even out the scan differences between horizontal scan and vertical scan for a complete picture. These extra pulses compensate for the "half line" difference indicated by the 252.5 horizontal scan line per vertical SYNC pulse metric. It is noted that it takes two vertical scans to fill out the picture (i.e., interlaced image). The NTSC system provides 525 lines for a complete picture and vertical retrace blanking. Thus, the ratio of 525 horizontal scan lines per two vertical SYNC pulses is used by the countdown timer 315 to provide an indication to the vertical lock detector 320 of the time that a vertical SYNC pulse is expected to be received. This ratio may be readily adapted to other video transmission/display systems, as will be appreciated by those skilled in the art.

The vertical lock detector 320 utilizes the provided countdown timer output signal Count to determine time intervals within which a vertical synchronizing pulse is expected to arrive. The V-lock detector 320 notes the arrival or occurrence of a vertical synchronizing pulse via edge or level triggering circuitry (not shown). The V-lock detector 320 provides an output signal $V_{ERROR}$ indicative of whether an expected vertical SYNC pulse failed to arrive.

The H-lock detector output signal $H_{ERROR}$ is coupled to the horizontal error counter 335, while the V-lock detector 320 error signal $V_{ERROR}$ is coupled to the vertical error counter 340. The horizontal error counter 335 counts the number of errors within a given time period and compares that number to a threshold number $H_{th}$. If the number of errors in a given period of time exceeds the threshold level $H_{th}$, an output signal HE indicates that a horizontal synchronizing pulse error condition exists.

The vertical error counter 340 counts the number of vertical errors within a given time period and compares that number to a vertical error threshold level $V_{th}$. If a number of errors indicated by the V-lock detector error signal $V_{error}$ exceeds the vertical error threshold lever $V_{th}$ within the given time interval, a vertical error signal Ve indicates such error conditions.

Optional SYNC reference generator 380 receives the input video signal VIDEO and responsively produces a horizontal reference signal $H_{REF}$ and a vertical reference signal $V_{REF}$ that are used to indicate appropriate time periods for receiving, respectively, horizontal SYNC pulses and vertical SYNC pulses. If the optional reference generator 380 is used, the horizontal reference signal $H_{REF}$ is coupled to the H-lock detector 325, while the vertical reference signal $V_{REF}$ is coupled to the V-lock detector 320. In this instance, the countdown timer 315 and clock 330 are not used. Optionally, only the horizontal reference signal $H_{REF}$ may be used, in which case the countdown timer 315 is used to indicate an appropriate vertical synchronizing pulse time period.

The logical AND gate 345 (or any logical equivalent) provides an output signal having two states, a "good SYNC" state and a "bad SYNC" state. In the event of a bad horizontal synchronizing signal (as indicated by error counter 335) or a bad vertical synchronizing signal V (as indicated by error counter 340), the output signal SQ of the logic gate 345 indicates the "bad SYNC" state.

The controller 140 of FIG. 1 is responsive to the SYNC quality signal SQ provided by the SYNC evaluation module 135. In response to a SYNC quality signal SQ indicative of valid and acceptable synchronization information within the video signal VIDEO, the controller 140 causes the recording device 145 to enter or maintain a record mode of operation. In response to a SYNC quality signal SQ indicative of absent or unacceptable synchronization information within the video signal, the controller 140 causes the recording device 145 to enter a record-pause or pause mode of operation.

Optionally, the controller 140 responds to a control signal $C_2$ from, for example, a remote control device (not shown) such that the operation of the recording device 145 within the second video device may be remotely controlled.

It is noted that in the case of the first video device 110 and second video device being responsive to similar remote control signals (e.g., both video devices being manufactured by the same company or adhering to the same control standards), the control signals $C_1$ and $C_2$ may simultaneously cause both the first video device 110 and second video device to record. In this instance, two recordings of video information provided to the first video device via an external source are made.

In one embodiment of the invention, the SYNC evaluation module 135 comprises a timer, for associating temporal information with each of a sequence of received synchronization pulses; a first differencer, for measuring temporal differences between successive synchronization pulses to determine respective synchronization pulse timing intervals; a second differencer, for measuring temporal differences between successive synchronization pulse timing intervals; and a comparator, for producing a control signal indicative of whether differences between successive synchronization pulse timing intervals exceed a threshold level. It is noted that the first and second differencers may be comprised of respective pairs of memory elements coupled to a subtractor. The first differencer memory elements store temporal information associated with successive synchronization pulses, while the second differencer memory elements store temporal information associated with successive synchronization pulse timing intervals. It is also noted that the pulse width of vertical and/or horizontal synchronizing pulses may be measured such that comparisons between successive respective vertical and/or horizontal synchronizing pulses may determine that, due to changes in measured pulse widths, received video quality has degraded, the source of a received signal has changed, or other video related anomalies have occurred.

In one application of the invention, where the first video device 110 comprises a camcorder including a plurality of scenes or recorded segments including "white space," or other video glitches, the second video device will operate to record only the valid video information conveyed by the first video device. That is, where the video information associated with the first video device includes invalid portions of video, the second video device will not record those invalid portions of video data. In this manner, the invention is operable to "clean up" sequences of video imagery including invalid portions.

Although various embodiments which incorporate the teachings of the present invention have been shown and described in detail herein, those skilled in the art can readily devise many other varied embodiments that still incorporate these teachings.

What is claimed is:

1. Apparatus, comprising:
an input circuit for receiving a video signal indicative of playback of a first recorded medium;
said video signal, said detection circuit including a horizontal lock detector for determining whether said horizontal synchronization signal is received at appropriate intervals, said horizontal lock detector producing an error signal indicative of the absence of a valid horizontal synchronization signal, said detection circuit including an error counter, for counting the number of horizontal synchronization signal errors during a predefined time period and indicating whether a threshold level of horizontal synchronization signal errors has been exceeded; and
said video signal responsive to detecting said horizontal synchronizing signal.

2. The apparatus of claim 1, further comprising a vertical lock detector, for determining whether a vertical synchronization signal is received at an appropriate time interval.

3. The apparatus of claim 2, wherein said detection circuit further comprises a countdown timer, responsive to a received horizontal synchronization signal, for producing an output signal indicative of a time interval during which a vertical synchronization signal is expected.

4. The apparatus of claim 3, wherein said detection circuit further comprises a second error counter, for counting the number of vertical synchronization signal errors during a predefined time period and indicating whether a vertical horizontal synchronization signal error threshold has been exceeded.

5. The apparatus of claim 1, wherein:

said detection circuit comprises a SYNC separator, for separating at least horizontal synchronization signals from said video signal; and a horizontal lock detector for determining whether a horizontal synchronization signal is received at appropriate intervals, said horizontal lock detector producing an error signal indicative of the absence of a valid horizontal synchronization signal.

6. The apparatus of claim 3, wherein said horizontal lock detector is responsive to a clocking signal.

7. A system, comprising:

a first video playback device providing a signal indicative of video recorded on a first medium during playback of said video; and a second video playback device responsive to said signal for selectively recording playback of said video on a second medium with pauses in said recording during at least one of an absence of video and playback of unacceptable video by said first video playback device.

8. The system of claim 7, wherein:

said detection circuit comprises a SYNC separator, for separating at least horizontal synchronization signals from said video signal; and a horizontal lock detector for determining whether a horizontal synchronization signal is received at appropriate intervals, said horizontal lock detector producing an error signal indicative of the absence of a valid horizontal synchronization signal.

9. The system of claim 7, wherein unacceptable video received by said second video playback device has associated with it synchronizing signals exhibiting at least one of degraded wave shapes and improper synchronizing intervals.

10. The system of claim 9, wherein said synchronizing signals associated with said playback video are evaluated by said second playback device.

11. The system of claim 10, wherein said second video playback device comprises:

an input circuit for receiving said playback video;

a detection circuit for detecting a horizontal synchronization signal component of said playback video; and a control circuit for controlling pauses in recording of video information from said playback video responsive to detecting said horizontal synchronizing signal.

12. The system of claim 11, wherein said detection circuit comprises a horizontal lock detector for determining whether a horizontal synchronization signal is received at appropriate intervals, said horizontal lock detector producing an error signal indicative of the absence of a valid horizontal synchronization signal.

13. The system of claim 12, wherein said detection circuit further comprises an error counter, for counting the number of horizontal synchronization signal errors during a predefined time period and indicating whether a threshold level of horizontal synchronization signal errors has been exceeded.

14. The system of claim 13, wherein said horizontal lock detector is responsive to a clocking signal.

15. The system of claim 12, further comprising a vertical lock detector, for determining whether a vertical synchronization signal is received at an appropriate time interval.

16. The system of claim 15, wherein said detection circuit further comprises a countdown timer, responsive to said horizontal synchronization signal, for producing an output signal indicative of a time interval during which a vertical synchronization signal is expected.

17. The system of claim 16, wherein said detection circuit further comprises a second error counter, for counting the number of vertical synchronization signal errors during a predefined time period and indicating whether a vertical horizontal synchronization signal error threshold has been exceeded.

18. A method for controlling a recording device, comprising the steps of:

evaluating synchronizing components associated with a received video signal to determine if said received video signal provides acceptable video;

separating said synchronization components from said received video signal;

determining whether a horizontal synchronization signal is received at appropriate intervals; and providing indicium of the absence of a valid horizontal synchronization signal;

enabling said recording device to record said received video in response to a positive evaluation of said synchronizing components; and causing said recording device to enter a pause mode of operation in response to a negative evaluation of said synchronizing components associated with said received video.

19. The method of claim 18, further comprising the step of:

separating said synchronization components from said received video signal.

* * * * *